(12) United States Patent
Tamai et al.

(10) Patent No.: US 8,879,911 B2
(45) Date of Patent: Nov. 4, 2014

(54) OPTICAL LINE TERMINAL, DYNAMIC BANDWIDTH ALLOCATION METHOD, AND OPTICAL COMMUNICATION NETWORK

(75) Inventors: Hideaki Tamai, Saitama (JP); Ryuji Hisano, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 274 days.

(21) Appl. No.: 13/370,805

(22) Filed: Feb. 10, 2012

(65) Prior Publication Data

US 2012/0213518 A1 Aug. 23, 2012

(30) Foreign Application Priority Data

Feb. 18, 2011 (JP) ................................ 2011-033616

(51) Int. Cl.
| | | |
|---|---|---|
| H04B 10/20 | (2006.01) | |
| H04J 14/00 | (2006.01) | |
| H04J 14/02 | (2006.01) | |
| H04L 12/911 | (2013.01) | |
| H04Q 11/00 | (2006.01) | |

(52) U.S. Cl.
CPC .... *H04J 14/0282* (2013.01); *H04Q 2011/0064* (2013.01); *H04J 14/0247* (2013.01); *H04L 47/72* (2013.01); *H04Q 11/0067* (2013.01); *H04J 14/0252* (2013.01)
USPC .............................................. 398/58; 398/68

(58) Field of Classification Search
CPC .............. H04J 14/0247; H04J 14/0252; H04J 14/0282; H04L 47/72; H04Q 11/0067; H04Q 2011/0064
USPC ................................. 398/69, 58, 68
See application file for complete search history.

(56) References Cited

U.S. PATENT DOCUMENTS

| | | | |
|---|---|---|---|
| 6,721,504 B2 * | 4/2004 | Kim et al. ........................ 398/58 |
| 6,778,508 B1 * | 8/2004 | Uematsu ........................ 370/319 |

(Continued)

FOREIGN PATENT DOCUMENTS

| | | | |
|---|---|---|---|
| JP | 2003-258824 A | | 9/2003 |
| JP | 2003258824 A | * | 9/2003 |
| JP | 2010-114822 A | | 5/2010 |
| JP | 2010114822 A | * | 5/2010 |

OTHER PUBLICATIONS

"Technical Fundamentals Lecture: GE-PON Technology", NTT Technical Journal, Aug. 2005, pp. 71-74.

(Continued)

*Primary Examiner* — Ken Vanderpuye
*Assistant Examiner* — Abbas H Alagheband
(74) *Attorney, Agent, or Firm* — Rabin & Berdo, P.C.

(57) ABSTRACT

There is provided an optical line terminal that dynamically allocates communication bandwidth to a plurality of optical network units in an optical communication network, the optical line terminal including a minimum bandwidth allocation unit calculating allocation bandwidth of the plurality of optical network units based on bandwidth request information notified by the plurality of optical network units, a comparison unit comparing an allocation cycle given as the sum total of allocation bandwidth allocated to the plurality of optical network units respectively with a predetermined threshold value, a best-effort bandwidth allocation unit calculating remaining bandwidth as best-effort bandwidth of the plurality of optical network units when the allocation cycle is less than the threshold value, and a bandwidth allocation unit allocating communication bandwidth of the plurality of optical network units based on the allocation bandwidth and the best-effort bandwidth.

13 Claims, 6 Drawing Sheets

(56) References Cited

U.S. PATENT DOCUMENTS

| | | | |
|---|---|---|---|
| 7,020,162 B2* | 3/2006 | Iwasaki et al. | 370/468 |
| 7,197,244 B2* | 3/2007 | Thomas et al. | 398/72 |
| 7,239,813 B2* | 7/2007 | Yajima et al. | 398/154 |
| 7,260,116 B2* | 8/2007 | Ota et al. | 370/477 |
| 7,525,971 B2* | 4/2009 | Carroll et al. | 370/395.4 |
| 7,602,800 B2* | 10/2009 | Endo et al. | 370/420 |
| 7,620,325 B2* | 11/2009 | Mizutani et al. | 398/100 |
| 7,720,072 B2* | 5/2010 | Tan et al. | 370/395.21 |
| 8,184,977 B2* | 5/2012 | Kazawa et al. | 398/72 |
| 8,457,495 B2* | 6/2013 | Mizutani et al. | 398/70 |
| 8,532,491 B2* | 9/2013 | Sakamoto et al. | 398/72 |
| 8,687,976 B1* | 4/2014 | Sindhu et al. | 398/168 |
| 2002/0027682 A1* | 3/2002 | Iwasaki et al. | 359/110 |
| 2003/0165118 A1* | 9/2003 | Ota et al. | 370/252 |
| 2007/0064731 A1* | 3/2007 | Mizutani et al. | 370/468 |
| 2007/0071031 A1* | 3/2007 | Shin et al. | 370/468 |
| 2007/0122151 A1* | 5/2007 | Watanabe | 398/69 |
| 2007/0133557 A1* | 6/2007 | Lee et al. | 370/395.4 |
| 2007/0133988 A1* | 6/2007 | Kim et al. | 398/69 |
| 2007/0140258 A1* | 6/2007 | Tan et al. | 370/395.21 |
| 2009/0162063 A1* | 6/2009 | Mizutani et al. | 398/58 |
| 2009/0190931 A1* | 7/2009 | Hamano et al. | 398/99 |
| 2009/0213874 A1* | 8/2009 | Levit | 370/468 |
| 2010/0061401 A1* | 3/2010 | Nakahira | 370/468 |
| 2010/0067901 A1* | 3/2010 | Mizutani et al. | 398/20 |
| 2010/0183304 A1* | 7/2010 | Spector | 398/66 |
| 2011/0044304 A1* | 2/2011 | Connelly et al. | 370/338 |
| 2012/0093500 A1* | 4/2012 | Shiba et al. | 398/25 |
| 2012/0093509 A1* | 4/2012 | Kazawa et al. | 398/58 |
| 2012/0106958 A1* | 5/2012 | Sakamoto et al. | 398/58 |
| 2012/0148247 A1* | 6/2012 | Skubic et al. | 398/58 |

OTHER PUBLICATIONS

Lam, Cedric. "Passive Optical Networks: Principles and Practice". Elsevier Inc., 2007, pp. 228-241.

* cited by examiner

FIG.5
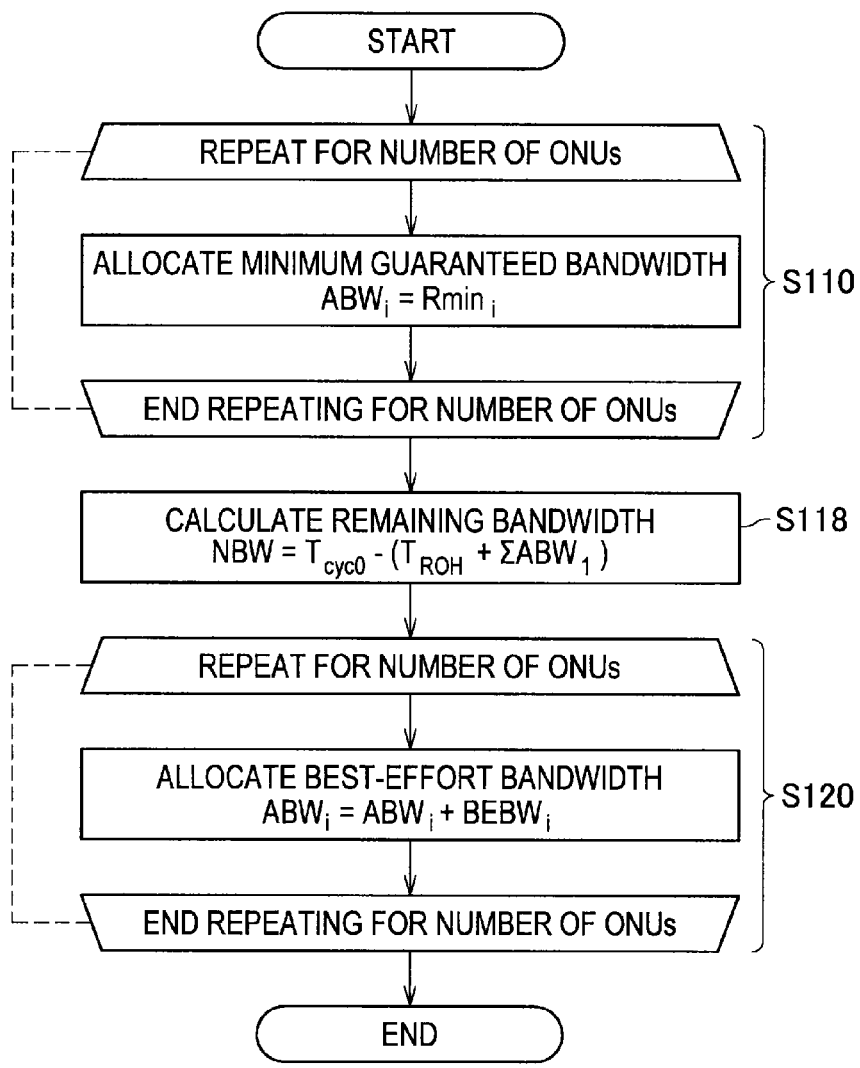
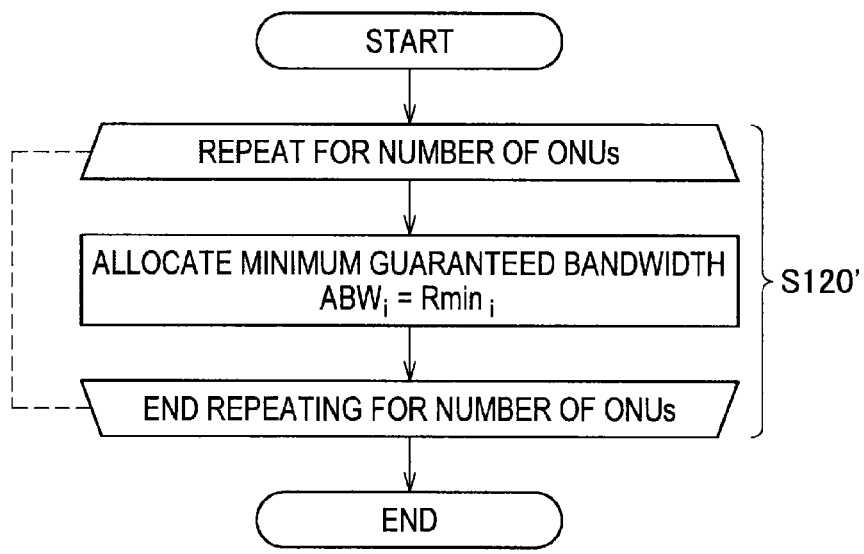

OPTICAL LINE TERMINAL, DYNAMIC BANDWIDTH ALLOCATION METHOD, AND OPTICAL COMMUNICATION NETWORK

CROSS-REFERENCE TO RELATED APPLICATION

This application is based on and claims priority under 35 USC 119 from Japanese patent Application No. 2011-033616 filed on Feb. 18, 2011, the disclosures of which are incorporated by reference herein.

BACKGROUND

1. Technical Field

The present disclosure relates to a dynamic bandwidth allocation method and an optical communication network, and particularly relates to bandwidth control on a passive optical network (PON).

2. Related Art

A telecommunications network that connects a building (central office) owned by a communications service provider to subscriber's premises is called an access network. With the recent increase in channel capacity, an optical access network that enables the transmission of enormous amounts of information by use of optical communication is going mainstream in the access network.

As a form of the optical access network, there is a passive optical network (PON). The PON includes one optical line terminal (OLT) provided in the central office, optical network units (ONUs) provided on a plurality of subscribers' premises respectively, and an optical splitter. The OLT, the ONUs and the optical splitter are connected with an optical fiber.

A single optical fiber is used for the connection between the OLT and the optical splitter. The single optical fiber is shared by a plurality of ONUs. Moreover, the optical splitter is an inexpensive passive element. In this manner, the PON is economical and easy to maintain, so that the PON is rapidly being introduced.

The PON uses various multiplexing technologies. Typical examples of the multiplexing technologies used by the PON include a time division multiplexing (TDM) technology, a wavelength division multiplexing (WDM) technology, and a code division multiplexing (CDM) technology. Time division multiplexing (TDM) is known as a system for allocating a short section on the time axis to each subscriber. Wavelength division multiplexing (WDM) is known as a system for allocating a different wavelength to each subscriber. Code division multiplexing (CDM) is known as a system for allocating a different code to each subscriber.

A TDM-PON using the TDM technology among these multiplexing technologies is widely being used at the moment. The PON using the multiplexing technology of TDM is disclosed in ""Technical Fundamentals Lecture: GE-PON Technology", NTT Technical Journal, August 2005, pp. 71-74", for example.

In the PON, a communication signal transmitted from the ONUs to the OLT (hereinafter sometimes referred to as the upstream signal) is multiplexed by the optical splitter and transmitted to the OLT.

On the other hand, a communication signal transmitted from the OLT to the ONUs (hereinafter sometimes referred to as the downstream signal) is demultiplexed by the optical splitter and transmitted to the ONUs.

Here, the upstream signal includes an upstream data signal and an upstream control signal. The upstream data signal is a signal transmitted from user equipment connected to the ONU to an upper network connected to the OLT.

In other words, the upstream data signal is a signal carrying information requested by a user.

On the other hand, the upstream control signal is a signal transmitted by a ONU controller included in the ONU to a optical line terminal controller included in the OLT, and is a signal used to control a network.

Moreover, the downstream signal includes a downstream data signal and a downstream control signal. The downstream data signal is a signal transmitted from the upper network to the user equipment.

In other words, the downstream data signal is a signal carrying information requested by the user.

On the other hand, the downstream control signal is a signal transmitted by the optical line terminal controller to the ONU controller, and is a signal used to control the network.

Time division multiple access (TDMA) is used for the TDM-PON.

TDMA is a technology where the OLT manages the transmission timing of each ONU and controls the upstream signals from different ONUs not to collide.

On the TDM-PON, the time axis is divided into a plurality of short sections, and the sections are allocated to the ONUs as communication time bandwidth for transmitting the upstream signals to the OLT.

The OLT instructs the ONUs on the transmission timing and the bandwidth of the upstream signal.

In this manner, that the OLT allocates communication time bandwidth to the ONUs is called bandwidth allocation.

Incidentally, the unit of "bandwidth" mentioned herein is given in time (seconds, for example).

Known as one of methods for allocating bandwidth is dynamic bandwidth allocation (DBA).

DBA is a bandwidth allocation method where the OLT receives transmission bandwidth requests from the ONUs and dynamically allocates communication bandwidth considering the bandwidth requests.

In DBA, a method for determining bandwidth to be allocated depending on queue lengths reported by the ONUs is especially called status reporting (SR)-DBA.

In SR-DBA, bandwidth to be allocated is updated at certain cycles (sometimes referred to as the allocation cycle).

In this case, the upstream control signal carries information on bandwidth that the ONU requests from the OLT, such as a queue length.

Moreover, the downstream control signal carries information on bandwidth that the OLT grants a transmission to the ONU, in other words, information on transmission timing and bandwidth.

SR-DBA known in related art can be classified into one handling the allocation cycle as a fixed parameter (hereinafter sometimes referred to as the fixed cycle mode) and one handling the allocation cycle as a variable parameter (hereinafter sometimes referred to as the floating cycle mode). For example, SR-DBA is disclosed in "Lam, Cedric. "Passive Optical Networks: Principles and Practice". Elsevier Inc., 2007".

In SR-DBA in the fixed cycle mode, firstly, the OLT allocates bandwidth corresponding to minimum guaranteed bandwidth (MinBW) to the ONUs.

The minimum guaranteed bandwidth is bandwidth that is previously decided under contract between a communications service provider and a user, and is guaranteed to be surely allocated even if communication traffic is congested. The minimum guaranteed bandwidth is a minimum value of bandwidth allocation.

Therefore, in SR-DBA in the fixed cycle mode, a fixed communication time decided based on the minimum guaranteed bandwidth is allocated as communication time bandwidth.

If there is still remaining bandwidth being unallocated space upon completion of allocating the minimum guaranteed bandwidth to all the ONUs, bandwidth allocation is performed on the remaining bandwidth as best-effort bandwidth.

The allocation of best-effort bandwidth is performed by distributing the remaining bandwidth at the rate of the minimum guaranteed bandwidth, for example.

Regardless of any amount of bandwidth requests of the ONUs, the allocation cycle is constant in SR-DBA in the fixed cycle mode.

In the following description, a constant allocation cycle may be referred to as the fixed allocation cycle in SR-DBA in the fixed cycle mode.

On the other hand, queue lengths notified by the ONUs are basically allocated as they are as bandwidth in SR-DBA in the floating cycle mode.

Considering the implementation of minimum guaranteed bandwidth services, the ONUs notify, as queue lengths, buffer amounts whose upper limits are set to the minimum guaranteed bandwidth.

Here, in SR-DBA in the floating cycle mode, the communication time necessary to transmit or receive is calculated based on the queue length notified by the ONU to set the commutation time as bandwidth.

The allocation cycle is determined by the sum total of bandwidth requested by the ONUs in SR-DBA in the floating cycle mode and accordingly varies depending on the number of ONUs that request bandwidth.

SUMMARY

Here, it is necessary to allocate bandwidth at the request for bandwidth corresponding to the minimum guaranteed bandwidth in order to realize a minimum guaranteed bandwidth service in SR-DBA in the fixed cycle mode.

Therefore, there is a need for the fixed allocation cycle to be get, assuming a situation where all ONUs request bandwidth.

Hence, the fixed allocation cycle is set to a value greater than the sum of the sum total of the minimum guaranteed bandwidth of all the ONUs and the time necessary for the OLT to receive the upstream control signals from the ONUs.

However, all the ONUs do not necessarily constantly request bandwidth; accordingly, if the number of ONUs that request bandwidth is small, the service is managed on an unnecessarily long allocation cycle.

Therefore, an unnecessary delay increases.

Incidentally, the delay herein indicates the time from the occurrence of the upstream data signal to a transmission to the OLT.

On the other hand, the allocation cycle is determined based on the sum total of the minimum guaranteed bandwidth of the ONUs that request bandwidth in SR-DBA in the floating cycle mode.

Therefore, if the number of ONUs that request bandwidth is small, the allocation cycle is shortened accordingly. As a result, the throughput of the upstream signal becomes large.

However, there exist, as a minimum value, the sum total of the time necessary to receive the upstream control signals from the ONUs, the time necessary to calculate bandwidth allocation, and the time necessary for the control signal to travel between the OLT and the ONU.

Hence, the allocation cycle does not fall below the minimum value.

For example, even if there are few bandwidth requests from the other ONUs and there is a margin for allocation bandwidth, the allocation cycle does not fall below the minimum value; accordingly, the throughput of the upstream signal is limited and therefore a transmission delay occurs.

In light of the foregoing, it is desirable to provide a dynamic bandwidth allocation method and an optical communication network for determining the allocation cycle in a manner of shortening a delay without adding constraints to the upstream throughput.

According to an embodiment of the present disclosure, there is provided a dynamic bandwidth allocation method, an optical communication network, an optical line terminal and an optical network unit, which include the following steps or configurations.

First, in a minimum guaranteed bandwidth allocation step, the OLT allocates request bandwidth notified by the ONUs as requested as allocation bandwidth of the ONUs.

Next, in the comparison step, the allocation cycle and a predetermined threshold value are compared.

Here, the allocation cycle is the sum total of a period of receiving the upstream control signal and allocation bandwidth allocated in the minimum guaranteed bandwidth allocation step.

Moreover, the threshold value is previously fixed as a value greater than the above minimum value, for example.

As a result of the comparison, if the allocation cycle is equal to or less than the threshold value, remaining bandwidth given as the difference between the threshold value and the allocation cycle is allocated as best-effort bandwidth in a best-effort bandwidth allocation step.

Moreover, according to another embodiment of the present disclosure, there is provided an optical communication network configured in a manner where one OLT is connected to a plurality of ONUs, the OLT including a optical line terminal controller and an upstream signal receiver.

The optical line terminal controller further includes a control signal reading/generating unit, a minimum guaranteed bandwidth allocation unit, a comparison unit, and a best-effort bandwidth allocation unit.

The control signal reading/generating unit reads request bandwidth notified by the optical network unit from the upstream control signal.

The minimum guaranteed bandwidth allocation unit allocates the request bandwidth notified by the plurality of ONUs as requested as allocation bandwidth of the ONUs.

The comparison unit compares an allocation cycle with a threshold value.

The best-effort bandwidth allocation unit allocates remaining bandwidth given as the difference between the threshold value and the allocation cycle to the plurality of ONUs as best-effort bandwidth if the allocation cycle is less than the threshold value.

BRIEF DESCRIPTION OF THE DRAWINGS

FIGS. 5A and 5B are views for comparing the dynamic bandwidth allocation method with related art, wherein FIG.

5A is a flow chart for explaining SR-DBA in a fixed cycle mode, and FIG. 5B is a flow chart for explaining SR-DBA in a floating cycle mode.

DETAILED DESCRIPTION OF THE EMBODIMENT(S)

A description will hereinafter be given of embodiments of the present disclosure with reference to the drawings; however, the drawings merely schematically show the present disclosure to an understandable degree.

Moreover, the present disclosure is not limited to the following embodiments, and various alterations or modifications that can achieve the effect of the present disclosure can be made without departing from the scope of the constitution of the present disclosure.

(Optical Communication Network)

A description will be given of an optical communication network of the present disclosure with reference to FIG. 1.

Figure 1:
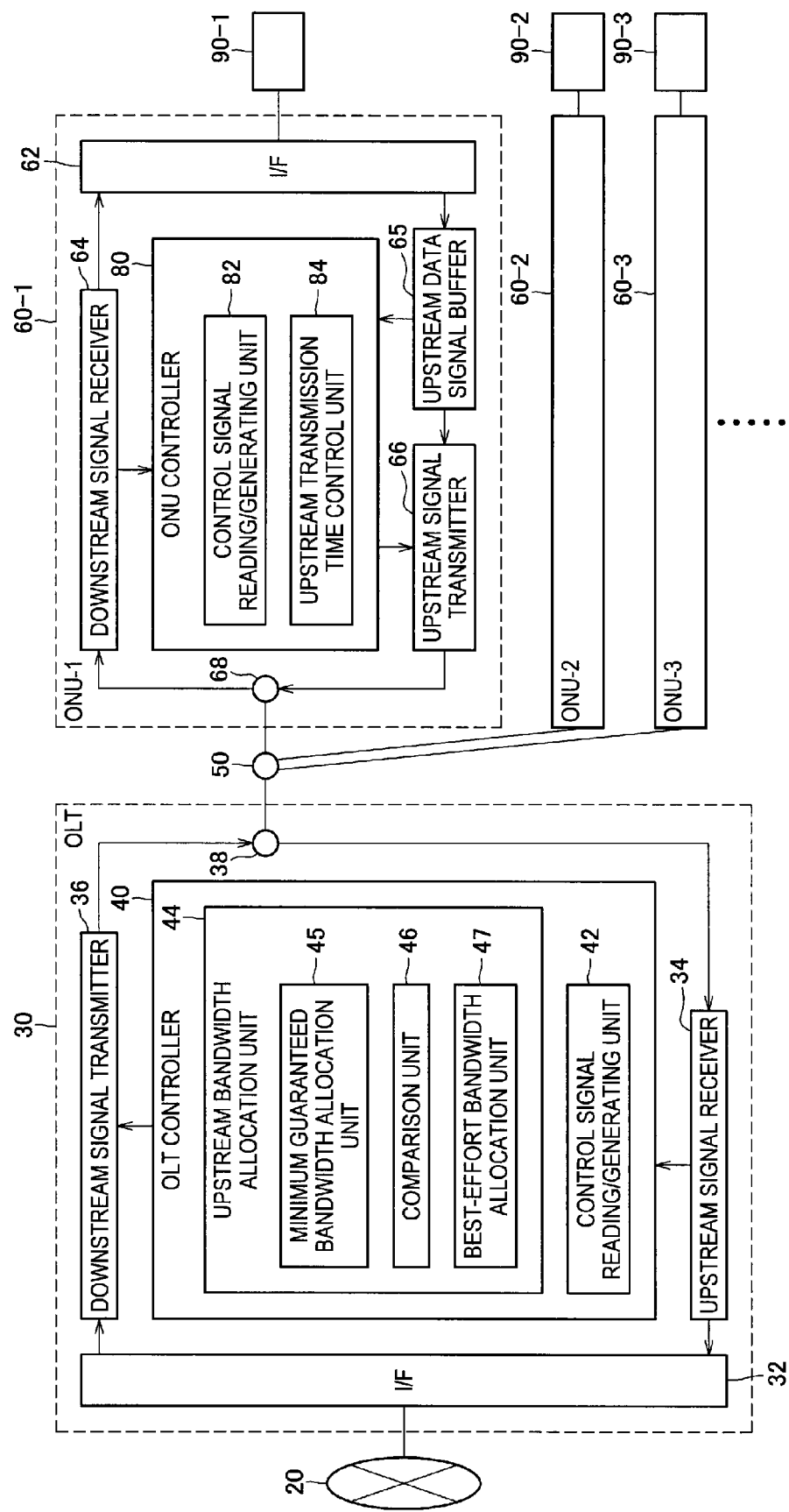
FIG. 1 is a schematic diagram illustrating a configuration example of an optical communication network.

FIG. 1 is a schematic diagram illustrating a configuration example of the optical communication network.

An optical communication network 10 in this configuration example is what is called a PON 10 including one optical line terminal (OLT) 30 and a plurality of optical network units (ONUs) 60.

The OLT 30 and the ONUs 60-1 to 60-3 are connected by an optical fiber via an optical splitter 50.

Three ONUs 60-1 to 60-3 are shown in FIG. 1; however, the number of ONUs constituting the PON 10 is not limited to three.

Signals to travel from the ONUs 60-1 to 60-3 to the OLT 30 are referred to as the upstream signals.

Moreover, signals to travel from the OLT 30 to the ONUs 60-1 to 60-3 are referred to as the downstream signals.

Here, the upstream signal includes an upstream data signal and an upstream control signal. The upstream data signal is a signal transmitted from user equipment 90 connected to the ONU 60 to an upper network 20 connected to the OLT 30. In other words, the upstream data signal is a signal carrying information requested by a user.

On the other hand, the upstream control signal is a signal transmitted by a ONU controller 80 included in the ONU 60 to a OLT controller 40 included in the OLT 30, and is used to control the PON 10.

The upstream control signal carries information on bandwidth that the ONU 60 requests from the OLT 30, such as information on a queue length.

Moreover, the downstream signal includes a downstream data signal and a downstream control signal. The downstream data signal is a signal transmitted from the upper network 20 to the user equipment 90. In other words, the downstream data signal is a signal carrying information requested by a user.

On the other hand, the downstream control signal is a signal transmitted from the OLT controller 40 to the ONU controller 80. The downstream control signal carries, for example, information on bandwidth that the OLT 30 grants a transmission to the ONU 60, in other words, information on bandwidth and transmission timing.

Incidentally, the upstream and downstream signals have two forms of an electrical signal and an optical signal, respectively. If they are distinguished, they are referred to as the upstream electrical signal, the upstream optical signal, the downstream electrical signal and the downstream optical signal.

The upstream and downstream control signals are periodically transmitted and received between the OLT 30 and the ONU 60 to perform stable communication on the PON 10.

The PON 10 of the embodiment may have a configuration known in related art except the function of the OLT controller 40 included in the OLT 30. Therefore, the description of the configuration known in related art may be omitted herein.

The OLT controller 40 may be configured to include a central processing unit (CPU), a random access memory (RAM), and a read only memory (ROM), for example.

The OLT controller 40 can realize functional units to be described later by the CPU reading and executing a program stored in the ROM.

Moreover, the processing results of the functional units are stored in the RAM in a freely readable and writable manner to pass the processing results.

The OLT 30 includes an interface converter (I/F) 32, an upstream signal receiver 34, a downstream signal transmitter 36, and the OLT controller 40.

The upstream signal receiver 34 converts the upstream optical signal received from the ONU 60 into an electrical signal to obtain the upstream electrical signal.

Furthermore, the upstream signal receiver 34 separates the upstream electrical signal into the upstream control signal and the upstream data signal.

The upstream control signal is transmitted to the OLT controller 40, and the upstream data signal is transmitted to the interface converter 32.

The interface converter 32 implements a communication protocol with the upper network 20 being an outside network.

The interface converter 32 implements the protocol on the upstream data signal received from the upstream signal receiver 34 to transmit the signal to the upper network 20.

Moreover, the interface converter 32 implements the communication protocol on the downstream data signal transmitted from the upper network 20 to transmit the signal to the downstream signal transmitter 36.

The OLT controller 40 includes a control signal reading/generating unit 42 and an upstream bandwidth allocation unit 44.

The control signal reading/generating unit 42 reads information received from the upstream signal receiver 34 and written on the upstream control signal, here, a queue length, as bandwidth request information.

Here, the bandwidth request information of the upstream control signal includes a plurality of queue lengths of a minimum request length Rmin and a maximum request length Rmax.

A description will be given of queue lengths with reference to FIG. 2.

Figure 2:
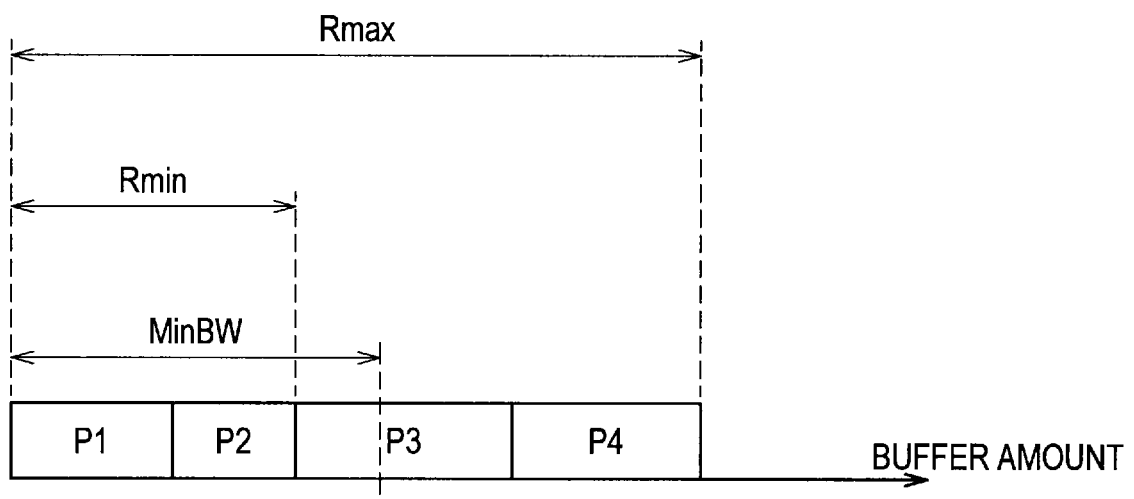
FIG. 2 is a schematic view for explaining queue lengths.

FIG. 2 is a schematic view for explaining queue lengths.

Here, two types of queue lengths, the minimum request length Rmin and the maximum request length Rmax, are used.

The minimum request length Rmin is defined as a buffer amount of when a minimum guaranteed bandwidth MinBW is set to an upper limit.

Therefore, the minimum request length Rmin is the sum of the lengths of packets that can complete being transmitted in the minimum guaranteed bandwidth MinBW, and the minimum request length Rmin is given as the sum of the packet lengths of packets P1 and P2 in the example shown in FIG. 2.

On the other hand, the maximum request length Rmax is defined as all data amount accumulated in an upstream data signal buffer.

In other words, the minimum request length Rmin is a minimum value of bandwidth that the ONU requests from the OLT, and the maximum request length Rmax is a maximum value of bandwidth that the ONU requests from the OLT.

In the example shown in FIG. 2, the maximum request length Rmax is given as the sum of the packet lengths of packets P1 to P4.

Moreover, the control signal reading/generating unit 42 generates the downstream control signal including bandwidth grant information by the upstream bandwidth allocation unit 44, and transmits the generated downstream control signal to the downstream signal transmitter 36.

The upstream bandwidth allocation unit 44 refers to the bandwidth request information read by the control signal reading/generating unit 42 to calculate transmission bandwidth for each ONU.

The calculated transmission bandwidth is transmitted to the ONUs as bandwidth grant information.

The upstream bandwidth allocation unit 44 includes a minimum guaranteed bandwidth allocation unit 45, a comparison unit 46, and a best-effort bandwidth allocation unit 47.

The minimum guaranteed bandwidth allocation unit 45 calculates request bandwidth notified by a plurality of ONUs as requested as allocation bandwidth of the ONUs.

Here, the calculations of allocation bandwidth made by the minimum guaranteed bandwidth allocation unit 45 are made while associating the ONUs 60-1 to 60-$n$ that have transmitted the bandwidth request information with their respective minimum request lengths Rmin. The calculation results are notified to the upstream bandwidth allocation unit 44. The minimum guaranteed bandwidth allocation unit 45 converts the minimum request lengths Rmin being the lengths of packets into periods spent on the transmission or reception of the lengths of the packets upon associating the ONUs 60-1 to 60-$n$ with their respective minimum request lengths Rmin.

The comparison unit 46 compares an allocation cycle with a threshold value.

If the allocation cycle is less than the threshold value, the best-effort bandwidth allocation unit 47 calculates remaining bandwidth given as the difference between the threshold value and the allocation cycle as best-effort bandwidth for the plurality of ONUs.

Here, the calculations of the best-effort bandwidth made by the best-effort bandwidth allocation unit 47 are made while associating the ONUs 60-1 to 60-$n$ that have transmitted the bandwidth request information with bandwidth where the best-effort bandwidth is distributed in accordance with the rate of the minimum guaranteed bandwidth. The calculation results are notified to the upstream bandwidth allocation unit 44.

In other words, the upstream bandwidth allocation unit 44 calculates the sum of the allocation bandwidth notified by the minimum guaranteed bandwidth allocation unit 45 and the best-effort bandwidth notified by the best-effort bandwidth allocation unit 47 as new allocation bandwidth for the ONUs 60-1 to 60-$n$ that have transmitted the bandwidth request information.

A detailed description will be given later of the functional units included in the upstream bandwidth allocation unit 44 and the method for calculating transmission bandwidth.

The downstream signal transmitter 36 time-multiplexes the downstream data signal and the downstream control signal to generate the downstream electrical signal, and converts the downstream electrical signal to an optical signal to generate the downstream optical signal.

An optical multiplexer/demultiplexer 38 multiplexes and demultiplexes the upstream and downstream optical signals. The center wavelengths of the upstream and downstream optical signals are generally different.

Therefore, the optical multiplexer/demultiplexer 38 is realized by using an optical wavelength filter.

Each ONU 60 includes an interface converter 62, a downstream signal receiver 64, an upstream data signal buffer 65, an upstream signal transmitter 66, the ONU controller 80 and an optical multiplexer/demultiplexer 68.

The downstream signal receiver 64 converts the downstream optical signal received from the OLT 30 into an electrical signal to obtain the downstream electrical signal.

Furthermore, the downstream signal receiver 64 separates the downstream electrical signal into the downstream control signal and the downstream data signal.

The downstream control signal is transmitted to the ONU controller 80, and the downstream data signal is transmitted to the interface converter 62.

The interface converter 62 implements a communication protocol with the user equipment 90. The interface converter 62 implements the protocol on the downstream data signal received from the downstream signal receiver 64 to transmit the signal to the user equipment 90.

Moreover, the interface converter 62 implements the protocol on the upstream data signal received from a user to transmit the signal to the upstream data signal buffer 65.

The upstream data signal buffer 65 temporarily accumulates the upstream data signals received from the interface converter 62.

The upstream data signal buffer 65 then outputs the accumulated upstream data signals in accordance with a read instruction of the upstream signal transmitter 66.

The ONU controller 80 includes a control signal reading/generating unit 82 and an upstream transmission time control unit 84. The control signal reading/generating unit 82 reads information received from the downstream signal receiver 64 and written on the downstream control signal, here, bandwidth grant information.

Moreover, the control signal reading/generating unit 82 reads the amount of data accumulated in the upstream data signal buffer 65 (queue length), generates the upstream control signal including the information to transmit the signal to the upstream signal transmitter 66.

The upstream transmission time control unit 84 instructs the timing to send out the upstream signal to the upstream signal transmitter 66 based on the bandwidth grant information read by the control signal reading/generating unit 82.

The upstream signal transmitter 66 time-multiplexes the upstream data signal and the upstream control signal to generate the upstream electrical signal, and converts the upstream electrical signal into an optical signal to generate the upstream optical signal.

The upstream optical signal is output in accordance with the instruction of the upstream transmission time control unit 84.

The optical multiplexer/demultiplexer 68 multiplexes and demultiplexes the upstream and downstream optical signals. The optical multiplexer/demultiplexer 68 is realized by an optical wavelength filter, or the like.

(Dynamic Bandwidth Allocation Method)

A description will be given of a dynamic bandwidth allocation method in the optical communication network with reference to FIGS. 3 and 4.

Figure 3:
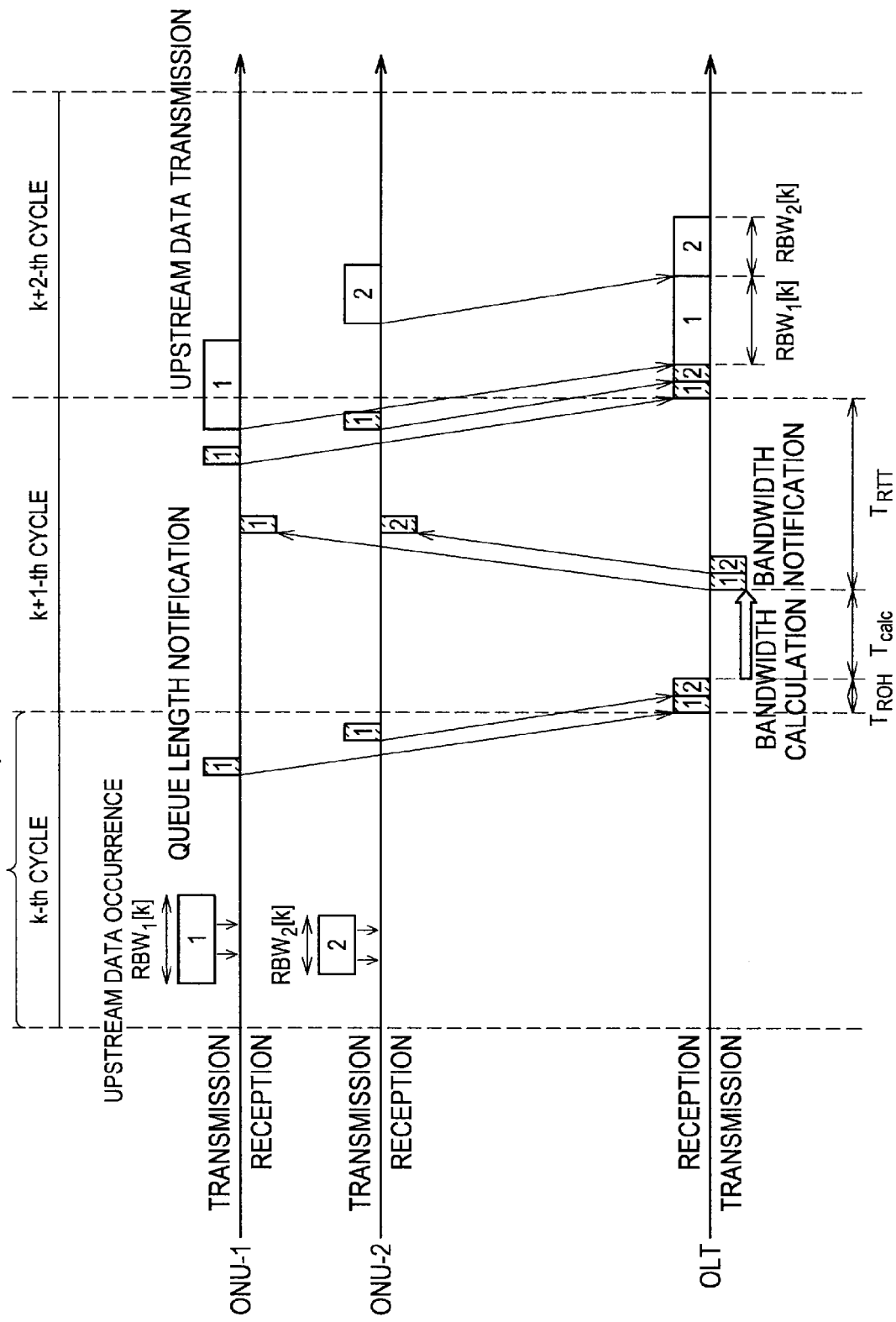
FIG. 3 is a timing chart for explaining a dynamic bandwidth allocation method.

FIG. 3 is a timing chart for explaining the dynamic bandwidth allocation method.

In FIG. 3, the horizontal axis indicates the time. In FIG. 3, two ONUs of an ONU-1 and an ONU-2, and an OLT are shown.

The OLT repeatedly transmits the downstream control signals to the ONUs.

Each ONU transmits the upstream control signal and the upstream data signal by use of the granted bandwidth in response to the reception of the downstream control signal.

Here, a description will be given, assuming that a period from when the OLT receives the upstream control signal from a certain ONU (here, the ONU-1) to when the OLT receives the upstream control signal again from the same ONU (ONU-1) is an allocation cycle $T_{cyc}$.

During the period of the allocation cycle $T_{cyc}$, the OLT allocates bandwidth to the ONUs so that the upstream data signals from the ONUs reach the OLT in a period during which the OLT does not receive the upstream control signals.

Incidentally, during the period of the allocation cycle $T_{cyc}$, the OLT receives the upstream control signals from the ONUs, calculates bandwidth to be allocated to the ONUs, and transmits the downstream control signals to the ONUs.

Consequently, assuming that the sum total of an upstream control signal reception period $T_{ROH}$ necessary to receive the upstream control signals, a bandwidth allocation calculation period $T_{calc}$ for calculating bandwidth for the ONUs and a bandwidth notification period $T_{RTT}$ necessary to transmit the downstream and upstream control signals as a minimum value (hereinafter referred to as the allocation cycle minimum value) $T_{cyc\_min}$, the allocation cycle $T_{cyc}$ is given as a period equal to or greater than the allocation cycle minimum value $T_{cyc\_min}$. The allocation cycle minimum value $T_{cyc\_min}$ is the total of the upstream control single reception period $T_{ROH}$, the bandwidth allocation calculation period $T_{calc}$ and the bandwidth notification period $T_{RTT}$.

It is assumed that at the k (k is an integer)-th allocation cycle (hereinafter sometimes referred to as the k-th cycle), the ONU-1 receives upstream data 1 from user equipment, and the ONU-2 receives upstream data 2 from user equipment.

The packet length of the data 1 is set as $RBW_1$ [k], and the packet length of the data 2 is set as $RBW_2$ [k].

The ONU-1 acquires a minimum request length $Rmin_1$ and a maximum request length $Rmax_1$ as queue lengths from the packet length $RBW_1$ [k] and minimum guaranteed bandwidth $MinBW_1$ to notify the queue lengths to the OLT.

Similarly, the ONU-2 acquires a minimum request length $Rmin_2$ and a maximum request length $Rmax_2$ as queue lengths from the packet length $RBW_2$ [k] and minimum guaranteed bandwidth $MinBW_2$ to notify the queue lengths to the Our.

In the upstream control signal reception period $T_{ROH}$ at the k+1-th cycle, the OLT receives the queue lengths as the bandwidth requests from the ONUs.

Next, in the bandwidth allocation calculation period $T_{calc}$, the upstream bandwidth allocation unit 44 of the OLT 30 calculates bandwidth to be allocated to the ONUs.

The bandwidth calculation made here includes a minimum guaranteed bandwidth allocation step, a comparison step and a best-effort bandwidth allocation step. Incidentally, at the k+1-th cycle, bandwidth is allocated for the upstream data signals that the ONUs transmit to the OLT at the k+2-th cycle.

A description will be given of the bandwidth calculation with reference to FIG. 4.

Figure 4:
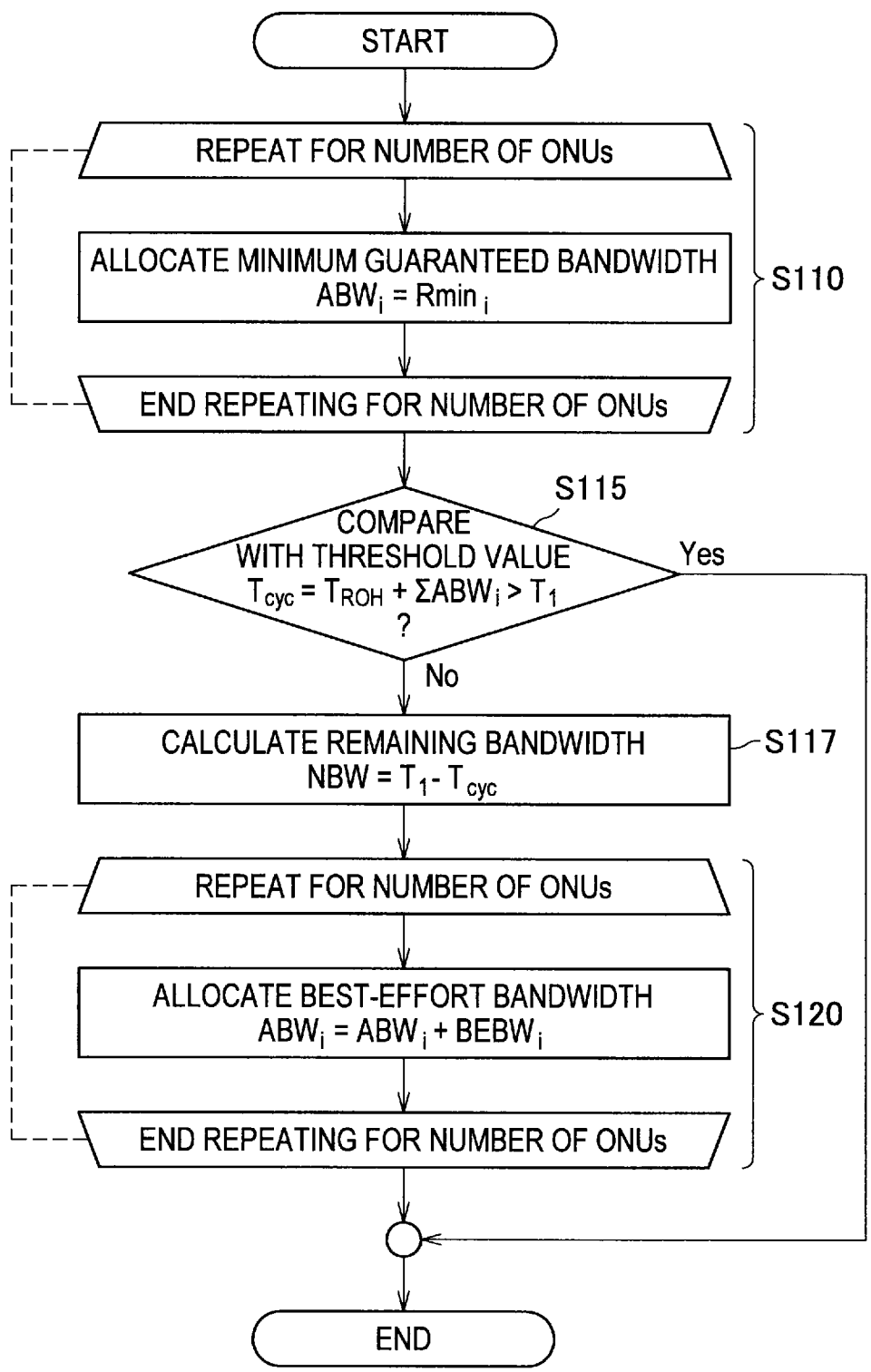
FIG. 4 is a view illustrating a process flow for explaining the dynamic bandwidth allocation method.

FIG. 4 is a view illustrating a process flow for explaining the dynamic bandwidth allocation method.

First, in the minimum guaranteed bandwidth allocation step (S110), the minimum guaranteed bandwidth allocation unit 45 included in the OLT 30 allocates to the ONUs bandwidth determined in accordance with the minimum guaranteed bandwidth MinBW.

Here, allocation bandwidth $ABW_i$ of an ONU-i is set as a minimum request length $Rmin_i$. The step is carried out on all ONUs that request bandwidth.

Here, the minimum request length Rmin is included in the upstream control signal from each ONU. The upstream control signal from each ONU also includes the maximum request length Rmax in addition to the minimum request length Rmin.

The control signal reading/generating unit 42 reads bandwidth request information from the upstream control signal, and the bandwidth request information includes the minimum request length Rmin and the maximum request length Rmax.

The minimum guaranteed bandwidth allocation unit 45 then compares the minimum request length Rmin and the maximum request length Rmax, which are included in the bandwidth request information, and determines that the shorter one is set as the minimum request length Rmin, and sets the minimum request length Rmin as the allocation bandwidth ABW.

In other words, the minimum guaranteed bandwidth allocation unit 45 acquires the minimum request length Rmin of the shortest bandwidth request length among a plurality of bandwidth request lengths included in the bandwidth request information.

Next, in the comparison step (S115), the comparison unit 46 included in the OLT 30 compares the allocation cycle $T_{cyc}$ with a threshold value $T_1$.

Here, the allocation cycle $T_{cyc}$ is given as the total of the upstream control signal reception period $T_{ROH}$ and the sum total of the allocation bandwidth $ABW_i$ allocated to the ONUs.

In other words, $T_{cyc}=T_{ROH}+\Sigma ABW_i$.

On the other hand, the threshold value $T_1$ is previously fixed to a value equal to or greater than $T_{cyc\_min}$ while setting $T_{cyc\_min}$ to be the smallest value.

$T_{cyc\_min}$ is given as $T_{cyc\_min}=T_{ROH}+T_{calc}+T_{RTT}$.

Being the value equal to or greater than $T_{cyc\_min}$, the threshold value $T_1$ is previously fixed on the condition that $T_1=T_{cyc\_min}$ or $T_1 > T_{cyc\_min}$.

If the allocation cycle $T_{cyc}$ is less than the threshold value $T_1$, the best-effort bandwidth allocation step is carried out.

In this case, first, the best-effort bandwidth allocation unit 47 included in the OLT 30 calculates remaining bandwidth NBW as the difference between the threshold value $T_1$ and the allocation cycle $T_{cyc}$ (S117).

Next, the best-effort bandwidth allocation unit 47 allocates to the ONUs the remaining bandwidth NBW given as the difference between the threshold value $T_1$ and the allocation cycle $T_{cyc}$ as the best-effort bandwidth. Best-effort bandwidth $BEBW_i$ is allocated to the ONUs whose allocation bandwidth $ABW_i$ at the moment does not reach the maximum request length $Rmax_i$.

Incidentally, it is desirable to distribute the best-effort bandwidth at the rate of a minimum guaranteed bandwidth $MinBW_i$, considering fairness between users.

In other words, the best-effort bandwidth $BEBW_i$ is given as $BEBW_i=NBW \times MinBW_i/\Sigma MinBW_i$.

Incidentally, the best-effort bandwidth may be distributed at the rate of the allocation bandwidth $ABW_i$ ($Rmin_i$) allocated to the ONUs in the minimum guaranteed bandwidth allocation step.

Newly setting the sum of the bandwidth $ABW_i$ allocated in the minimum guaranteed bandwidth allocation step (S110) and the best-effort bandwidth $BEBW_i$ to the allocation bandwidth $ABW_i$, the OLT ends the allocation calculations for the ONUs.

On the other hand, as a result of the comparison in the comparison step, if the allocation cycle $T_{cyc}$ is equal to or greater than the threshold value $T_1$, the best-effort bandwidth allocation step is not carried out, and the allocation calculations are ended.

In this case, the bandwidth $ABW_i$ allocated in the minimum guaranteed bandwidth allocation step (S110) is allocated to the ONUs as it is as the allocation bandwidth $ABW_i$.

The allocation method of the embodiment compares the allocation cycle at the point of allocating bandwidth corresponding to the minimum guaranteed bandwidth and the threshold value $T_1$. Using the comparison result, bandwidth allocation is performed in the floating cycle mode if the allocation cycle $T_{cyc}$ is equal to or greater than the threshold value $T_1$, and bandwidth allocation is performed in the fixed cycle mode of the cycle $T_1$ if the allocation cycle $T_{cyc}$ is less than the threshold value $T_1$.

Therefore, the allocation cycle in the embodiment can be expressed by the following equation.

$$T_{cyc} = \begin{cases} T_1 & \dots (T_{cyc} \leq T_1) \\ T_{ROH} + \sum Rmin_i & \dots (T_{cyc} > T_1) \end{cases} \quad \text{[Formula 1]}$$

A description will be given of the difference between the embodiment and the related art with reference to FIGS. 5A and 5B and 6A, 6B and 6C. FIG. 5A is a flow chart for explaining SR-DBA in the fixed cycle mode.

Moreover, FIG. 5B is a flow chart for explaining SR-DBA in the floating cycle mode.

Figure 6:
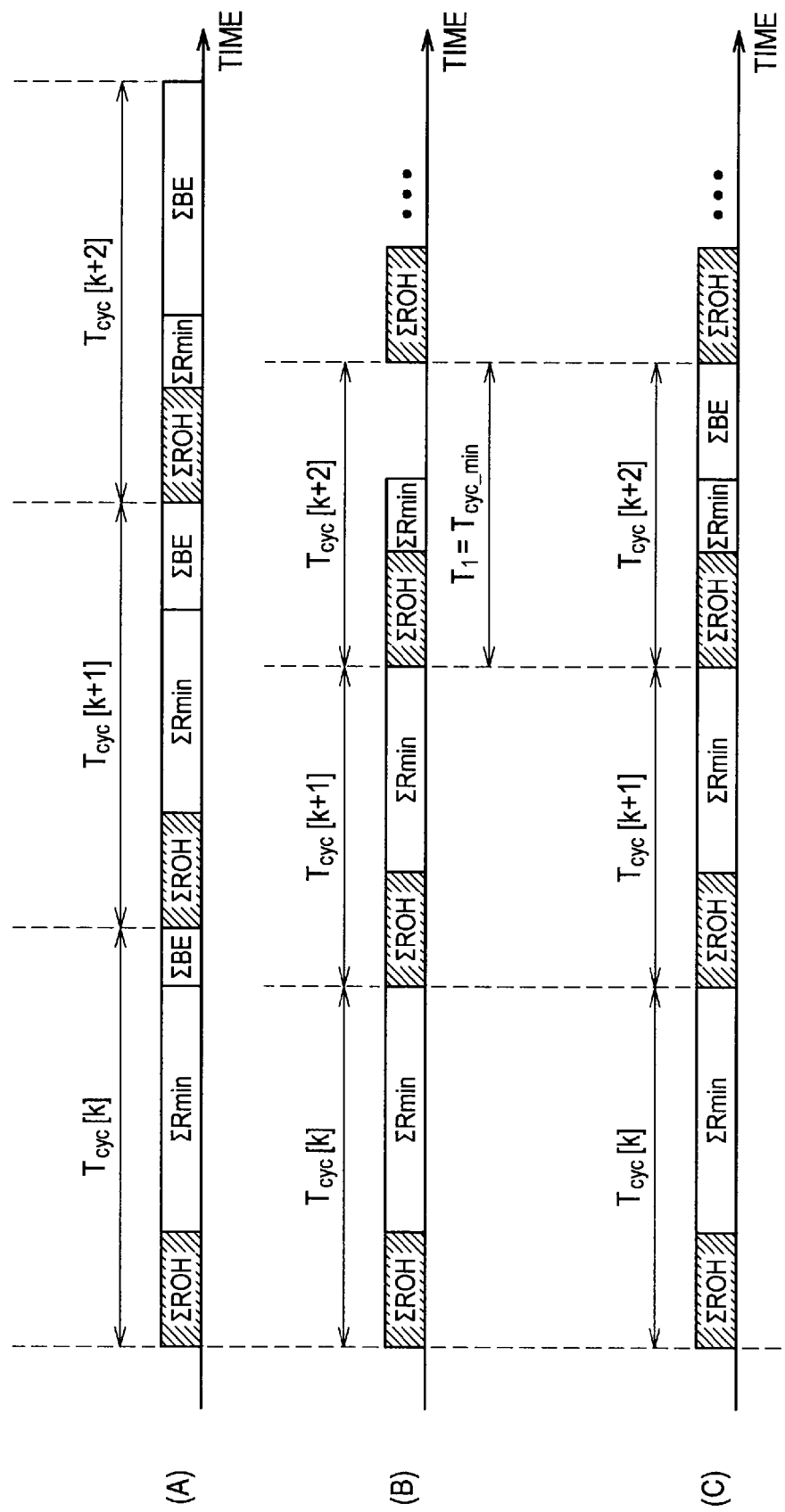
FIGS. 6A, 6B and 6C are schematic views illustrating results of bandwidth allocation performed by use of SR-DBA of the fixed cycle mode, the floating cycle mode and an embodiment of the present disclosure, respectively.

FIGS. 6A, 6B and 6C are schematic views illustrating results of bandwidth allocation performed by use of SR-DBA of the fixed cycle mode, the floating cycle mode and the embodiment, respectively.

Incidentally, here, the threshold value $T_1$ is set to $T_{cyc\_min}$.

Moreover, it is assumed that the same bandwidth request has been made for each SR-DBA.

First, a comparison is made between the fixed cycle mode and the embodiment.

In the case of the bandwidth allocation in the fixed cycle mode, first, bandwidth corresponding to minimum guaranteed bandwidth is allocated to the ONUs (S110).

Next, remaining bandwidth being unallocated bandwidth upon completion of allocating the bandwidth corresponding to the minimum guaranteed bandwidth (S118) is allocated as best-effort bandwidth (S120).

Incidentally, the best-effort bandwidth is distributed at the rate of the minimum guaranteed bandwidth $MinBW_i$, considering fairness between users.

Here, in SR-DBA of the fixed cycle mode, the remaining bandwidth is given as the difference between a fixed allocation cycle $T_{cyc0}$ and the allocation cycle allocated in the minimum guaranteed bandwidth allocation step (S110) (S118).

In contrast, in SR-DBA of the embodiment described with reference to FIG. 4, the remaining bandwidth is given as the difference between the threshold value $T_1$ and the allocation cycle allocated in the minimum guaranteed bandwidth allocation step (S110) (S117).

In the fixed cycle mode, even if the amount of requests for bandwidth corresponding to the minimum guaranteed bandwidth decreases and a bandwidth allocation amount ($\Sigma$ Rmin) based on the minimum guaranteed bandwidth decreases, a bandwidth allocation amount ($\Sigma$ BE) based on the best-effort bandwidth increases, and the allocation cycle is constant.

In contrast, in the bandwidth allocation of the embodiment, the allocation cycle $T_{cyc}$ is shortened in accordance with the decrease in the bandwidth allocation amount ($\Sigma$ Rmin) based on the minimum guaranteed bandwidth.

This shows that the bandwidth allocation of the embodiment secures the minimum guaranteed bandwidth while allocating bandwidth in a manner of shortening a delay.

Next, a comparison is made between the floating cycle mode and the embodiment. In the case of the bandwidth allocation of the floating cycle mode, bandwidth corresponding to queue lengths notified by the ONUs is allocated as it is (S120').

Incidentally, considering fairness between users, it is assumed that the ONUs notify the minimum request lengths Rmin as queue lengths. In the floating cycle mode, the notified queue lengths are set as the final allocation bandwidth for the ONUs, and the allocation calculations are ended.

If there are few bandwidth requests in the floating cycle mode, the allocation cycle is shortened accordingly, and therefore the upstream throughput increases.

However, it is difficult to set the allocation cycle to equal to or less than $T_{cyc\_min}$. Consequently, a blank where bandwidth is not allocated occurs in the allocation bandwidth, so that the upstream throughout is limited.

In contrast, in the method of the embodiment, if the allocation cycle falls below the minimum value $T_{cyc\_min}$, a blank slot occurring in the floating cycle mode can be used as the best-effort bandwidth; accordingly, it is possible to solve the constraints on the upstream throughput and realize high throughput. (It is more desirable to refer to FIG. 6C. FIG. 6C may be used in the above description.)

What is claimed is:

1. An optical line terminal dynamically allocating communication bandwidth to a plurality of optical network units in an optical network, the optical line terminal comprising:

a minimum bandwidth allocation unit calculating an allocation bandwidth of the plurality of optical network units based on bandwidth request information notified by the plurality of optical network units;

a comparison unit comparing an allocation cycle given as a sum total of the allocation bandwidth allocated to the plurality of optical network units respectively with a predetermined threshold value;

a best-effort bandwidth allocation unit calculating a remaining bandwidth as a best-effort bandwidth of the plurality of optical network units when the allocation cycle is less than the threshold value; and a bandwidth allocation unit allocating the communication bandwidth of the plurality of optical network units based on the allocation bandwidth and the best-effort bandwidth, wherein the optical line terminal exchanges control signals and data signals with the plurality of optical network units, and wherein the threshold value is a sum total of:

a period during which the optical line terminal receives the control signals from the plurality of optical network units;

a period during which the optical line terminal calculates bandwidth to be allocated to the plurality of optical network units; and a period during which the optical line terminal transmits the control signals to the plurality of optical network units.

2. An optical line terminal dynamically allocating communication bandwidth to a plurality of optical network units in an optical network, the optical line terminal comprising:
   a minimum bandwidth allocation unit calculating an allocation bandwidth of the plurality of optical network units based on bandwidth request information notified by the plurality of optical network units;
   a comparison unit comparing an allocation cycle given as a sum total of the allocation bandwidth allocated to the plurality of optical network units respectively with a predetermined threshold value;
   a best-effort bandwidth allocation unit calculating a remaining bandwidth as a best-effort bandwidth of the plurality of optical network units when the allocation cycle is less than the threshold value; and
   a bandwidth allocation unit allocating the communication bandwidth of the plurality of optical network units based on the allocation bandwidth and the best-effort bandwidth,
   wherein when the allocation cycle is less than the threshold value, the best-effort bandwidth allocation unit calculates the remaining bandwidth based on a difference between the threshold value and the allocation cycle, and calculates the remaining bandwidth as the respective best-effort bandwidth of the plurality of optical network units based on any one of rates of contract bandwidth of respective users of the plurality of optical network units and rates of the allocation bandwidth of the plurality of optical network units of the minimum bandwidth allocation unit.

3. The optical line terminal according to claim 2,
   wherein when the allocation cycle is greater than the threshold value, the bandwidth allocation unit sets the allocation bandwidth as the communication bandwidth, notifies the communication bandwidth to any of the plurality of optical network units, and allocates the communication bandwidth.

4. The optical line terminal according to claim 1,
   wherein when the allocation cycle is less than the threshold value, the best-effort bandwidth allocation unit calculates the remaining bandwidth based on a difference between the threshold value and the allocation cycle, and calculates the remaining bandwidth as the best-effort bandwidth of the plurality of optical network units.

5. An optical line terminal dynamically allocating communication bandwidth to a plurality of optical network units in an optical network, the optical line terminal comprising:
   a minimum bandwidth allocation unit calculating an allocation bandwidth of the plurality of optical network units based on bandwidth request information notified by the plurality of optical network units;
   a comparison unit comparing an allocation cycle given as a sum total of the allocation bandwidth allocated to the plurality of optical network units respectively with a predetermined threshold value;
   a best-effort bandwidth allocation unit calculating a remaining bandwidth as a best-effort bandwidth of the plurality of optical network units when the allocation cycle is less than the threshold value; and
   a bandwidth allocation unit allocating the communication bandwidth of the plurality of optical network units based on the allocation bandwidth and the best-effort bandwidth,
   wherein the optical line terminal periodically exchanges control signals and data signals with the plurality of optical network units, and
   wherein the allocation bandwidth of the plurality of optical network units calculated by the minimum bandwidth allocation unit, the best-effort bandwidth calculated by the best-effort bandwidth allocation unit, and the communication bandwidth of the plurality of optical network units allocated by the bandwidth allocation unit are bandwidth related to reception of the data signals.

6. An optical line terminal dynamically allocating communication bandwidth to a plurality of optical network units in an optical network, the optical line terminal comprising:
   a minimum bandwidth allocation unit calculating an allocation bandwidth of the plurality of optical network units based on bandwidth request information notified by the plurality of optical network units;
   a comparison unit comparing an allocation cycle given as a sum total of the allocation bandwidth allocated to the plurality of optical network units respectively with a predetermined threshold value;
   a best-effort bandwidth allocation unit calculating a remaining bandwidth as a best-effort bandwidth of the plurality of optical network units when the allocation cycle is less than the threshold value; and
   a bandwidth allocation unit allocating the communication bandwidth of the plurality of optical network units based on the allocation bandwidth and the best-effort bandwidth,
   wherein the bandwidth request information notified by the plurality of optical network units includes a bandwidth request length expressed in a packet length as request bandwidth, and
   wherein the minimum bandwidth allocation unit calculates, as the allocation bandwidth of the plurality of optical network units, a period spent to receive a length of a packet of the bandwidth request length included in the bandwidth request information notified by the plurality of optical network units.

7. An optical line terminal dynamically allocating communication bandwidth to a plurality of optical network units in an optical network, the optical line terminal comprising:
   a minimum bandwidth allocation unit calculating an allocation bandwidth of the plurality of optical network units based on bandwidth request information notified by the plurality of optical network units;
   a comparison unit comparing an allocation cycle given as a sum total of the allocation bandwidth allocated to the plurality of optical network units respectively with a predetermined threshold value;
   a best-effort bandwidth allocation unit calculating a remaining bandwidth as a best-effort bandwidth of the plurality of optical network units when the allocation cycle is less than the threshold value; and
   a bandwidth allocation unit allocating the communication bandwidth of the plurality of optical network units based on the allocation bandwidth and the best-effort bandwidth,
   wherein the bandwidth request information notified by the plurality of optical network units includes a plurality of bandwidth request lengths expressed in packet lengths as request bandwidth, and
   wherein the minimum bandwidth allocation unit acquires a smallest bandwidth request length among the plurality of bandwidth request lengths included in the bandwidth request information notified by the plurality of optical network units, and calculates, as the allocation bandwidth of the plurality of optical network units, a period spent to receive a length of a packet of the smallest bandwidth request length.

8. The optical line terminal according to claim 7, wherein the plurality of bandwidth request lengths include a shortest request length of a smallest packet length and a longest request length of a largest packet length as bandwidth that any of the plurality of optical terminal units requests from the optical line terminal.

9. A dynamic bandwidth allocation method in an optical line terminal in an optical communication network configured in a manner that the optical line terminal is connected to a plurality of optical network units, the dynamic bandwidth allocation method comprising:
 calculating an allocation bandwidth of the plurality of optical network units based on bandwidth request information notified by the plurality of optical network units to allocate minimum bandwidth;
 comparing allocation cycle given as a sum total of the allocation bandwidth allocated to the plurality of optical network units respectively with a predetermined threshold value;
 when the allocation cycle is less than the threshold value, calculating a remaining bandwidth as a best-effort bandwidth of the plurality of optical network units to allocate the best-effort bandwidth; and
 allocating communication bandwidth of the plurality of optical network units based on the allocation bandwidth and the best-effort bandwidth,
 wherein when the allocation cycle is less than the threshold value, the best-effort bandwidth allocation step includes:
  calculating the remaining bandwidth based on the difference between the threshold value and the allocation cycle; and
  calculating the remaining bandwidth as the respective best-effort bandwidth of the plurality of optical network units based on any one of rates of contract bandwidth of respective users of the plurality of optical network units and rates of the allocation bandwidth of the plurality of optical network units in the minimum bandwidth allocation step.

10. An optical communication network configured in a manner that an optical line terminal is connected to a plurality of optical network units,
 the optical line terminal comprising:
 a optical line terminal controller; and
 an upstream signal receiver separating an upstream signal received from the optical network unit into an upstream control signal and an upstream data signal, and transmitting the upstream control signal to the optical line terminal controller,
 wherein the optical line terminal controller further includes:
  a control signal reading/generating unit reading a bandwidth request notified by the optical network unit from the upstream control signal;
  a minimum bandwidth allocation unit calculating an allocation bandwidth of the plurality of optical network units based on the bandwidth request;
  a comparison unit comparing an allocation cycle given as a sum total of the allocation bandwidth allocated to the plurality of optical network units respectively with a predetermined threshold value;
  a best-effort bandwidth allocation unit calculating a remaining bandwidth as a best-effort bandwidth of the plurality of optical network units when the allocation cycle is less than the threshold value; and
  a bandwidth allocation unit allocating communication bandwidth of the plurality of optical network units based on the allocation bandwidth and the best-effort bandwidth,
 wherein when the allocation cycle is less than the threshold value, the best-effort bandwidth allocation unit calculates the remaining bandwidth based on the difference between the threshold value and the allocation cycle, and calculates the remaining bandwidth as the respective best-effort bandwidth of the plurality of optical network units based on any one of rates of contract bandwidth of respective users of the plurality of optical network units and rates of the allocation bandwidth of the plurality of optical network units of the minimum bandwidth allocation unit.

11. The optical line terminal according to claim 5, wherein when the allocation cycle is less than the threshold value, the best-effort bandwidth allocation unit calculates the remaining bandwidth based on a difference between the threshold value and the allocation cycle, and calculates the remaining bandwidth as the best-effort bandwidth of the plurality of optical network units.

12. The optical line terminal according to claim 6, wherein when the allocation cycle is less than the threshold value, the best-effort bandwidth allocation unit calculates the remaining bandwidth based on a difference between the threshold value and the allocation cycle, and calculates the remaining bandwidth as the best-effort bandwidth of the plurality of optical network units.

13. The optical line terminal according to claim 7, wherein when the allocation cycle is less than the threshold value, the best-effort bandwidth allocation unit calculates the remaining bandwidth based on a difference between the threshold value and the allocation cycle, and calculates the remaining bandwidth as the best-effort bandwidth of the plurality of optical network units.

* * * * *